Jan. 24, 1939.   W. BEUSCH ET AL   2,145,069
REGISTERING MECHANISM
Filed Nov. 25, 1936   2 Sheets-Sheet 1

INVENTORS
*Willi Beusch*
*Werner Zingg*
BY
*Morgan Finnegan and Durham*
ATTORNEYS.

Jan. 24, 1939.                W. BEUSCH ET AL                2,145,069
                            REGISTERING MECHANISM
                         Filed Nov. 25, 1936        2 Sheets-Sheet 2

Patented Jan. 24, 1939

2,145,069

UNITED STATES PATENT OFFICE 2,145,069

REGISTERING MECHANISM

Willi Beusch and Werner Zingg, Zug, Switzerland, assignors to Landis & Gyr, A-G., a corporation of Switzerland Application November 25, 1936, Serial No. 112,631
In Switzerland November 27, 1935

5 Claims. (Cl. 171—34)

The present invention relates to electricity meters and more particularly to a novel and improved registering mechanism of a maximum demand meter.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

Figure 1:
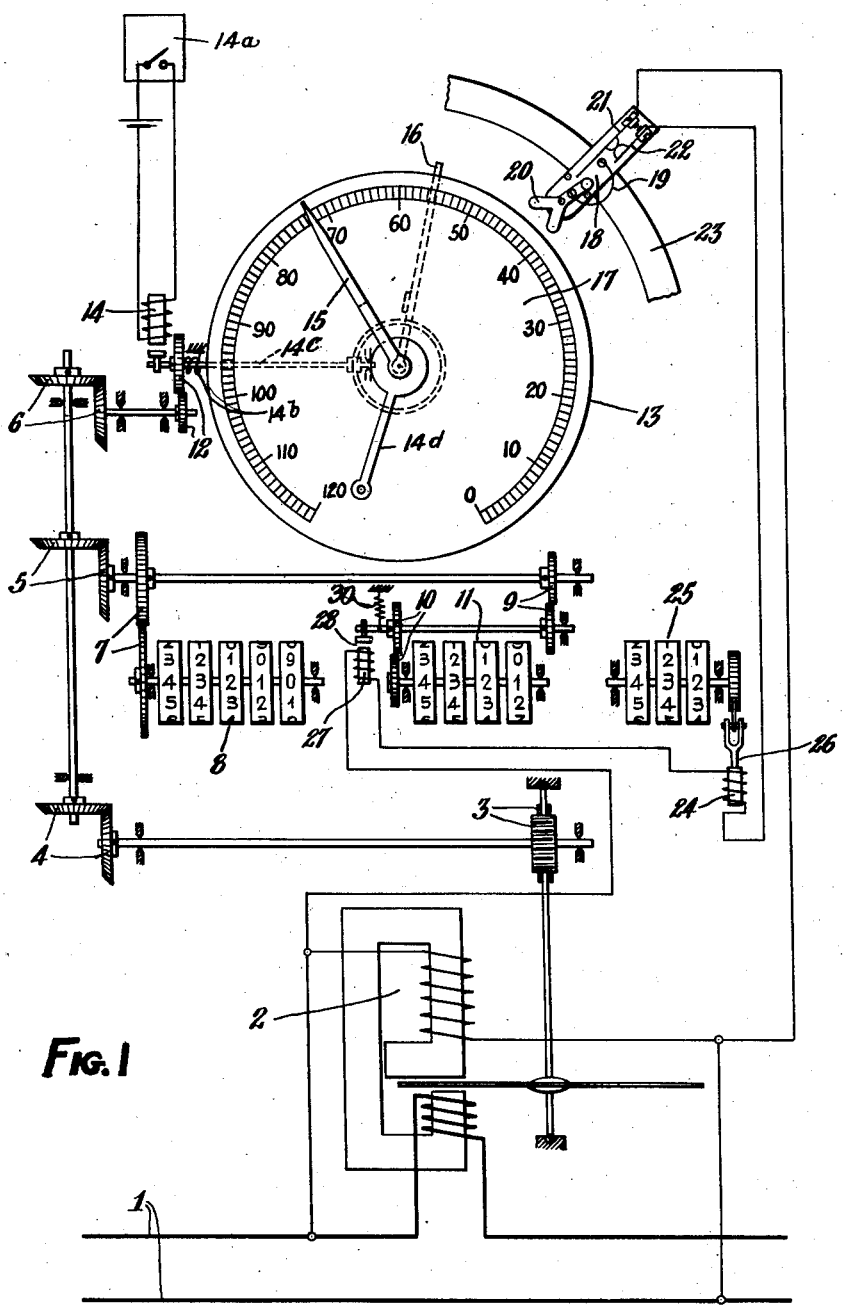

Figure 1 of the drawings illustrates diagrammatically a typical embodiment of the present invention, and together with the description serves to explain the principles of the invention.

Figure 2:
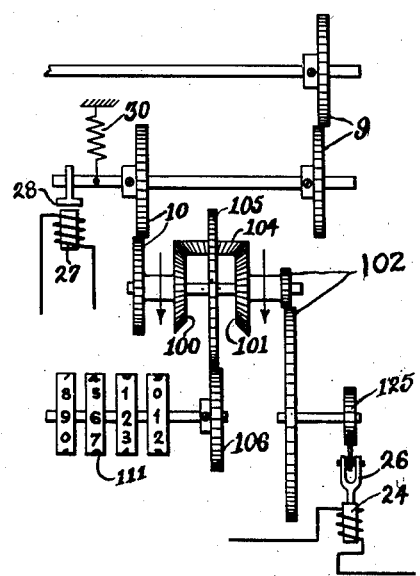

Figure 2 of the drawings is a fragmentary diagrammatic showing of a modification of the invention.

The present invention has for its object the provision of a novel and improved maximum demand meter registering the total energy consumption, the maximum demand, the excess energy consumption and the number of times the predetermined load limit is exceeded. A further object of the invention is the provision of a novel and improved electricity meter forming the basis for a more equitable rate charge which may be based in part on demand and excess consumption factors of the customer's load.

In medium-sized and large electric plants the electric current is charged for in accordance with a basic rate, and a maximum meter is most frequently used for computing the customer's charge, this meter recording not only the total consumption but also the maximum demand. Therefore, the ascertainment of the basic fee is made by giving due consideration to the maximum demand as indicated by the maximum indicator. In this connection, however, it is possible that the indicated maximum demand has only occurred once. Furthermore, because time periods of the maximum meter are not synchronized, consumers with exactly the same load curves may be charged differently. The computing process can, therefore, lead to unfair treatment of the consumers. The present meter makes possible a much better and fairer computation of the current used in accordance with the basic rate.

The present invention relates to an improved maximum demand meter which makes possible the use of a more advantageous computing process based on the basic rate than is possible by using the customarily used maximum demand meters. In accordance with the invention there is always recorded by a special registering mechanism device the total consumption of an excess demand period, namely, the period in which the consumption exceeds a variable but predetermined demand. The registering mechanism can contain a means which, upon demand exceeding the consumption limit, registers both the occurring excess demand and also the normal load. A second registering mechanism is also preferably provided which registers the number of excess demand periods. In connection with the registering mechanism, means may be provided so that one of the two registering devices registers the occurring excess demand and the other the number of excess demand periods.

In the drawings there are shown a maximum demand meter with a maximum demand registering device and a totalizing means containing two registering mechanisms.

A Ferraris disc meter 2 connected with the consumer's circuit 1 drives gears 3, 4, 5 and 6. Gears 5 are releasably coupled through gears 7 with a totalizing register 8 to register the total power consumption and, through the gears 9, 10, with the registering mechanism 11 to register the excess demand within each registering period. The other gears 6 are connected in turn through releasable gears 12 with the maximum demand indicator 13.

The maximum demand indicator 13 is shown as a modification of a conventional type and comprises a releasing relay 14 released by periodic closure of switch 14a acting upon the releasable gears 12; a frictionally held drag hand 15, a current demand pointer 16 for moving hand 15 and a dial 17. When relay 14 is energized, spring 14b returns shaft 14c and arm 14d to an initial or zero position at the same time moving the pointer 16 to zero position. The current demand hand 16 also cooperates with a contact device 18 which consists of the pivoted lever 20 which is under the influence of a toggle spring 19 and the two spring mounted contacts 21, 22. The contact device 18 for the variable predetermination of the normal permissible demand is adjustable on the ring 23 arranged concentrically with the dial disc 17. There are arranged in series with the contacts 21, 22 of the contact device 18 the winding 24 of a relay 26 acting upon a totalizing register 25 for the registration of the number of excess demand periods and the winding 27 of a relay 28 acting upon the releasable gear 10 of the totalizing register 11.

As current is used in the customer's circuit, and during each registering period, meter 2 actuates the totalizing register 8 to show the total consumption and the maximum demand indicator 13. During this time, the registering device 11 which registers any excess consumption, is disengaged from the metering mechanism 2. At the end of the registering period the releasing relay 14 is excited for a short time and the maximum demand indicator is disengaged from the meter mechanism 2. The demand hand 16 thereupon returns to its starting position in the usual manner by means of a spring 14b. If during this registering period the permissible demand value has not been reached, the contact device 18 will not be operated by the current demand hand 16. The contact device 18, therefore, remains in the open position so that the relays 26, 28 of the two counting mechanisms 25, 11 are not excited. The current demand hand 16, however, will act on the pivoted lever 20 of the contact device 18 during any registering period in which the permissible demand value is exceeded. In the drawings there is shown such a position of the maximum demand indicator 13. Here, furthermore, the maximum demand pointer 15 is in a still higher position than the current demand hand 16. Therefore, in one of the preceding registering periods the demand must have been still higher than was the case during the last registering period. The current demand hand 16 can, of course, be moved still further in accordance with the consumption taking place and upon sufficiently high demand it can carry along the maximum demand hand 15 in counter-clockwise direction.

If, therefore, during a registering period the permissible maximum demand is exceeded, then the current demand hand 16 will bring the contact device 18 into circuit-closing position so that the two relays 26 and 28 are excited and thereby the counting mechanism 11 will be coupled with the meter 2 and driven by the same. Furthermore, the register mechanism 25 is advanced one step by the relay 26. At the end of the registering period the releasing relay 14 will cause a disengaging of the maximum demand indicator 13 from the meter 2. The current demand hand 16 will then actuate, upon its return to the starting position, the contact device 18, resetting it to open position so that the relays 26 and 28 are deenergized. The armature of the relay 26 thereupon due to gravity again drops and the counting mechanism is disengaged from the meter system 2 by the pull of the spring 30. The individual parts of the maximum demand indicator are then again in their starting positions so that the process described can be repeated during the next period.

This embodiment of the invention therefore provides means for registering (1) The total consumption in KWH as indicated by the totalizing register 8;

(2) The total consumption during the excess demand periods, indicated by the totalizing register 11;

(3) The number of excess demand periods as recorded by the register 25, and (4) The highest demand as indicated by the maximum demand hand 15.

On the basis of these data, for instance, the following rate bases may be established.

*Tariff agreement*

(a) Demand rate based upon the expected normal demand in KW, (b) A rate for total power consumption meausured in KWH in accordance with item 1, (c) An additional rate for all power (KWH) consumed during any period of excess demand in accordance with item 2, (d) An additional rate based on the maximum indicated demand in accordance with item 4.

An additional rate base may be used with items a, b, c as above but involving the fixing of an additional charge per KW in accordance with 4, which, however, only then enters into force when the over-consumption periods reach or exceed a certain number From the two tariff agreements it can be noted that they do not contain the drawbacks of a pure maximum demand rate, as neither of the two rates is based on a single excess. Rather, several overloads are permitted to the consumer, for which he, however, is required to pay. In order to avoid unlimited increase of temporary overloads, the maximum indication is taken into consideration for the fixing of an additional rate. In connection with either tariff agreement, the consumer will try not to exceed the basic rate schedule inasmuch as in such a case only will the total consumption of KWH be at the lowest price.

One can also obtain another evaluation of the data shown by the maximum meter. Therefore, for further explanation of another tariff agreement, attention is called to the fact that upon every excess of the predetermined demand limit by the register 25 a very definite consumption quantity is counted. Furthermore, the totalizing register 11 counts the excess demand consumption taking place during any excess period. If one adds these two consumption quantities, there is obtained for every excess period the total consumption. For this consumption an additional charge must be paid.

In connection with this manner of computation it happens that small frequent overloads are more expensive to the consumer than high infrequent cases of overloads. This can easily be explained, if one compares the total consumption within a definite number of recording periods with a second equal total consumption comprising several low overloads and only a few high overloads. In the former case the consumer will pay more for the KWH used than in the second case. This peculiar feature of the computing process is especially desirable for the reason that it forces the consumer to determine exactly the performance in accordance with the rates.

Such a rate basis would be along the following lines:

(a) A basic rate for a given demand based upon a certain amount per KW.

(b) Fixing of an operating fee per KWH in accordance with 1.

(c) Fixing of an additional fee per KWH for the total consumption in the overload periods.

(d) Fixing of an additional fee per KW in accordance with 4, in case of exceeding the agreed basic demand rate, or (d') Fixing of an additional fee per KW in accordance with 4, which, however, is used only when the overload periods reach or exceed a certain number.

From the three above-mentioned tariff arrangements it can be immediately noted that also the electric plant, without being compelled to charge higher unit prices, will be able to operate profitably.

In accordance with a modified embodiment of the invention as shown in Figure 2 of the drawings, the registration of the total energy consumption during overload periods can also be effected by the use of differential gearing serving to add to the total energy consumption an amount determined by the number of overloads, thus totalizing the registered totals of the registers 11 and 25 of Figure 1. As embodied, gears 10 are placed in mesh to drive differential sun gear 100 during the excess consumption period, and sun gear 101 is also advanced through gears 102 by the operation of relay 26 on ratchet wheel 125. Sun gears 100 and 101 mesh with planet gear 104 which is carried on the ring gear 105 and meshes with the gear 106 which serves to drive the register 111.

The invention in its broader aspects is not limited to the specific mechanisms shown and described but departures may be made therefrom within the scope of the accompanying claims without departing from the principles of the invention and without sacrificing its chief advantages.

What we claim is:—

1. A demand meter including in combination a power meter, a periodic maximum demand meter, two totalizing registers, means for driving one of the totalizing registers by the power meter only during periods of excess demand whereby the total power consumed during periods of excess demand is totalized and means for always driving the other register from the power meter.

2. A demand meter including in combination a Ferraris meter, a totalizing register, a periodic maximum demand indicator, said register and indicator being driven by the Ferraris meter, a second totalizing register and means for driving it by the Ferraris meter only during overload periods.

3. A demand meter including in combination two totalizing registers, a Ferraris meter disc geared to drive one register, means for selectively driving the other register from the disc, a periodic excess demand register driven by the disc and means controlled by the demand register for controlling the selective drive.

4. The meter of claim 1 in which a totalizing register is provided to register the number of periods during which an overload occurs.

5. The meter of claim 2 in which a totalizing register is provided to register the number of periods during which an overload occurs.

WILLI BEUSCH.
WERNER ZINGG.